United States Patent [19]

Murakami et al.

[11] Patent Number: 4,583,120
[45] Date of Patent: Apr. 15, 1986

[54] GHOST CANCELLER

[75] Inventors: Junzo Murakami, Kawasaki; Hisao Fujiwara, Tokyo, both of Japan

[73] Assignee: Kabushiki Kaisha Toshiba, Kawasaki, Japan

[21] Appl. No.: 608,958

[22] Filed: May 10, 1984

[30] Foreign Application Priority Data

May 17, 1983 [JP] Japan .................................. 58-86055

[51] Int. Cl.⁴ ........................ H04N 5/213; H04N 5/14
[52] U.S. Cl. .................................... 358/167; 358/166; 358/905
[58] Field of Search ......................... 358/167, 166, 905

[56] References Cited

U.S. PATENT DOCUMENTS 4,344,089  8/1982  Utsunomiya et al. ............... 358/167

FOREIGN PATENT DOCUMENTS 2073553  10/1981  United Kingdom .

OTHER PUBLICATIONS

Patents Abstracts of Japan, vol. 5, No. 133 (E-71) [805], 25th Aug. 1981; & JP-A-56 69 973 (Tokyo Shibaura Denki K.K.).

Primary Examiner—Michael A. Masinick
Assistant Examiner—E. Anne Toth
Attorney, Agent, or Firm—Oblon, Fisher, Spivak, McClelland & Maier

[57] ABSTRACT

A ghost canceller includes a ghost canceling circuit having a transversal filter for receiving a television input signal and a tap gain holding circuit for holding tap gains of the filter, a ghost detector, and a means for writing tap gain data into the tap gain data holding circuit in response to the ghost detector to permit a ghost component in an output signal of the ghost canceling circuit to be canceled out. In order to prevent the disturbance of a TV screen due to a transient response which occurs upon writing tap gain data into the tap gain data holding circuit, an output means is provided for permitting a signal other than the output signal of the ghost canceling circuit to be selectively taken out during a first time period including an interval in which tap gain data is written into the tap gain holding circuit and for permitting an output signal of the ghost canceling circuit to be selectively taken out during a second time period other than the first time period.

5 Claims, 5 Drawing Figures

1

GHOST CANCELLER

BACKGROUND OF THE INVENTION

This invention relates to a ghost canceller for a television receiver.

An arrangement as shown, for example, in FIG. 1 is known as a ghost canceller. Such a canceller is disclosed in Murakami et al "TV Ghost Canceller" Toshiba Review 36 Vol. No. 7, pp 625 to 630, June 1981, which is adapted to cancel out the ghost component of a received signal by preparing a ghost replica by a transversal filter 20 capable of properly setting tap gains and subtracting the gohst replica from the received signal in a subtracting circuit 26. As a reference signal for ghost detection, use is made of a step-like waveform of the leading edge of a vertical synchronizing pulse of a television signal. A ghost detector 27 in FIG. 1 is adapted to detect the reference signal (the leading edge portion of the vertical synchronizing pulse) at the output of subtracting circuit 26, identify the position, polarity, amplitude, etc. of a ghost component signal and a tap gain correcting circuit 28 corrects tap gains stored in a tap gain memory 29. The contents of tap gain memory 29 is transferred at a proper time to a tap gain holding circuit 23 which is included in transversal filter 20. The tap gain holding circuit 23 is adapted to hold fixed tap gains during one field of a TV signal. The outputs of tap gain holding circuit 23 provide control voltages to weighting circuits 22 of the respective taps of transversal filter to vary the weight coefficients (tap gain) for an input signal applied to a delay line 21. Normally, the correction of tap gains is repeated for each reception of the reference signal. By the repetitive correction the tap gains are approximated to respective optimum values, permitting the cancellation of ghost. The reference signal inputting time, as well as the above-mentioned operation of the circuit, is controlled by a timing circuit 40.

The transversal filter 20 as disclosed in the above-mentioned document is comprised of an integrated circuit, in which a charge-coupled device (CCD) is used as delay element 21 and capacitor memories (C-memory) are used as tap gain holding circuit 23. Since an appreciably greater capacitance cannot be taken with respect to a capacitor memory element due to a restricted chip area, voltage values in the memory cannot be held during the field period of the TV signal. For this reason, the capacitor memories are refreshed by voltages obtained by D/A converting the contents of tap gain memory 29 comprised of digital elements, several hundred times per one field. In this case, an image on a TV screen is likely to be disturbed due to a transient response in transversal filter 20 which occurs when the capacitor memories are refreshed.

A type of the integrated CCD transversal filter has been developed in which digital memories and D/A converters are incorporated as a tap gain holding circuit 23 with respect to the respective taps. For further detail, reference is invited to Nagashima et al "Programable CCD Transversal Filter TL8507P" Toshiba Review Vol. 37, No. 3, pp. 190-194 March 1982. In such a digital memory-equipped transversal filter, the tap gain holding time is theoretically infinite. When the tap gains are updated once per one field, they are completely held until the next field. If, during the vertical blanking period of the TV signal, the tap gain data is transferred from tap gain memory 29 to tap gain holding circuit 23, an adverse effect of the transient response in the transversal filter resulting from the data transfer, upon the image of the TV screen, is suppressed to a minimum level. Even in this case, it is difficult to suppress below an allowable level the disturbance of the image on the TV screen by a transient response which occurs during the data transfer. This often disturbs the vertical synchronization on the TV screen. The suppression of the transient response per se below the allowable level is most desirable, but it is not easy to achieve such suppression from the standpoint of the IC manufacturing technique. Heretofore, no satisfactory IC type CCD transversal filter has been implemented.

SUMMARY OF THE INVENTION

It is accordingly an object of this invention to provide a ghost canceller which includes a ghost canceling circuit having a transversal filter for receiving a TV input signal and a tap gain holding circuit for holding the tap gains of the transversal filter for a predetermined time period and for permitting the tap gain data to be written therein periodically whereby a ghost component is canceled out, and which is arranged to prevent the disturbance of an image on a TV screen which is caused due to a transient response when the tap gain data of the tap gain holding circuit is updated.

According to this invention, an output means is provided which permits a signal other than the output signal of the ghost canceling circuit to be selectively taken out during a first time period including an interval in which tap gain data is written into the tap gain holding circuit and permits an output signal of the ghost canceling circuit to be selectively taken out during a second time period other than the first time period.

According to a first embodiment of this invention the signal selected during the first time period is a television input signal of the ghost canceling circuit. According to a second embodiment of this invention the signal selected during the first time period is synchronizing signals of a vertical blanking time period which is produced in response to a TV input signal.

DETAILED DESCRIPTION OF THE PREFERRED EMBODIMENTS

Figure 1:
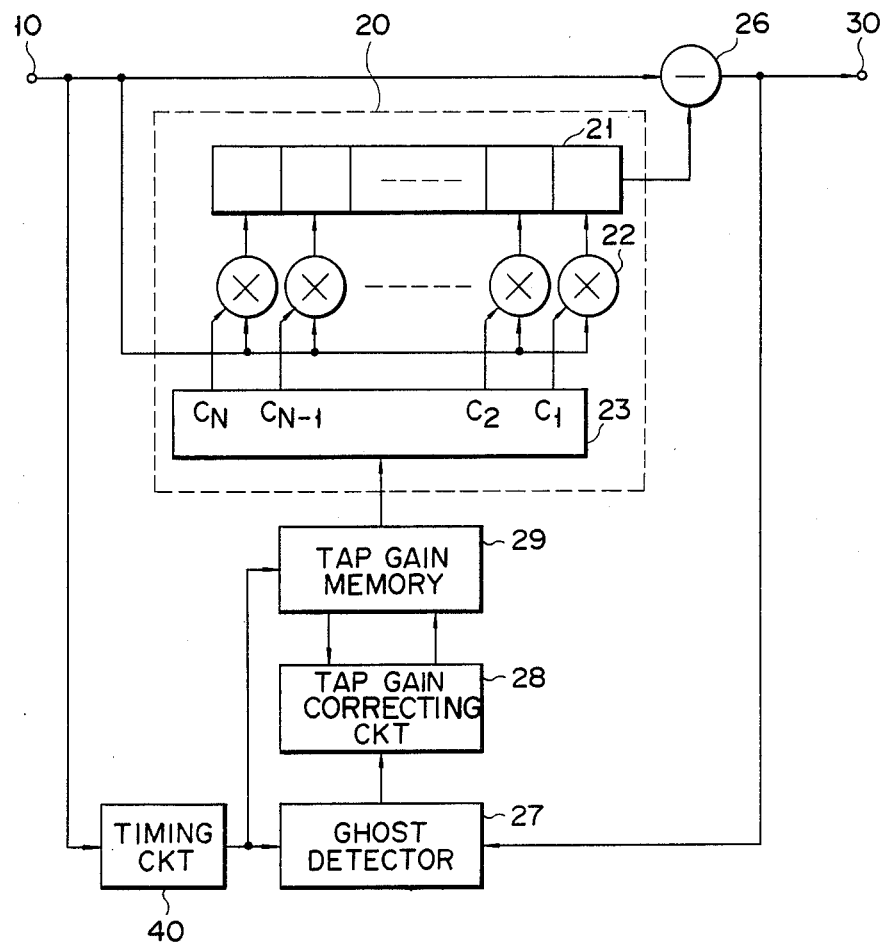
FIG. 1 is a block diagram of a known ghost canceller.
Figure 2:
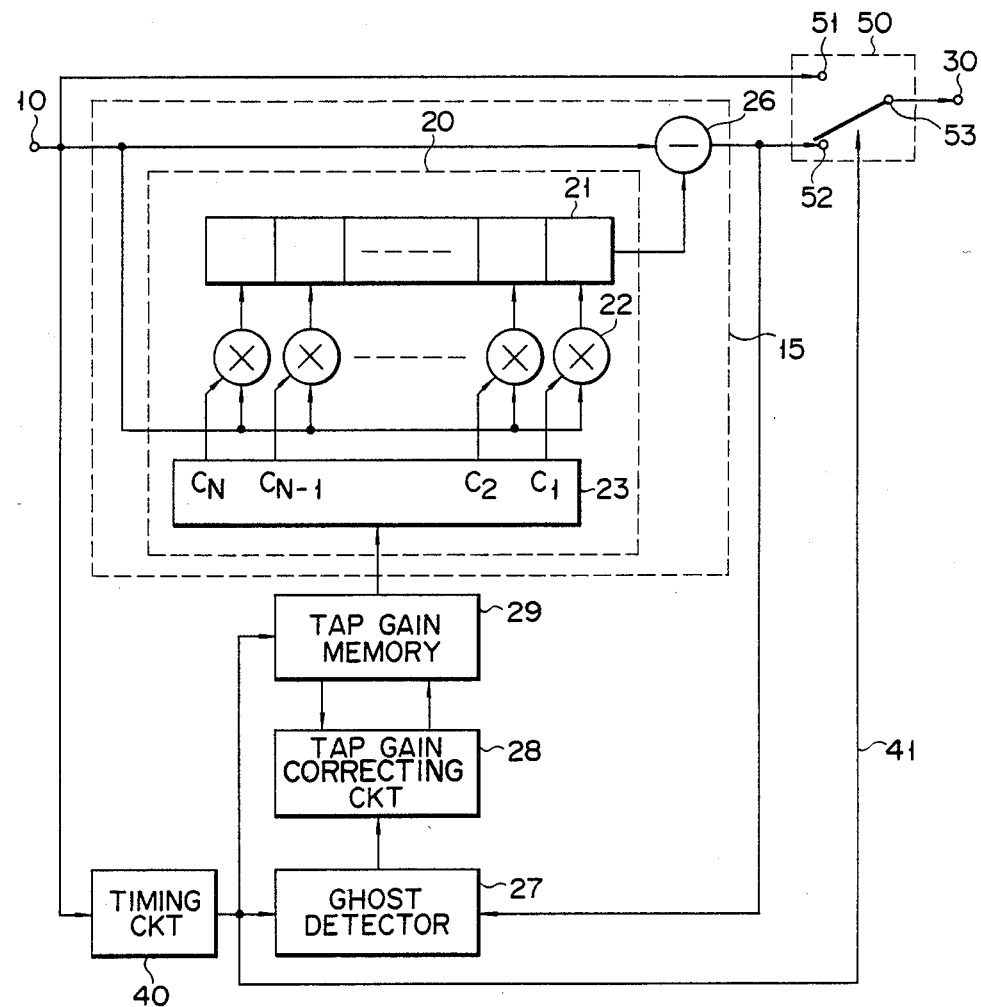
FIG. 2 is a block diagram of a ghost canceller according to one embodiment of this invention.

FIG. 2 shows a ghost canceller according to one embodiment of this invention which is basically similar in its arrangement to an arrangement of FIG. 1, except for the use of a changeover switch 50. The changeover switch 50 has a first terminal 51 connected to an input terminal 10, a second terminal 52 connected to an output terminal of a ghost canceller 15 including a transversal filter 20, i.e., an output terminal of a subtracting circuit 26, and a common terminal connected to a output terminal 30. The changeover switch 50 is controlled by a control signal 41 which is produced by a timing circuit 40.

Figure 3:
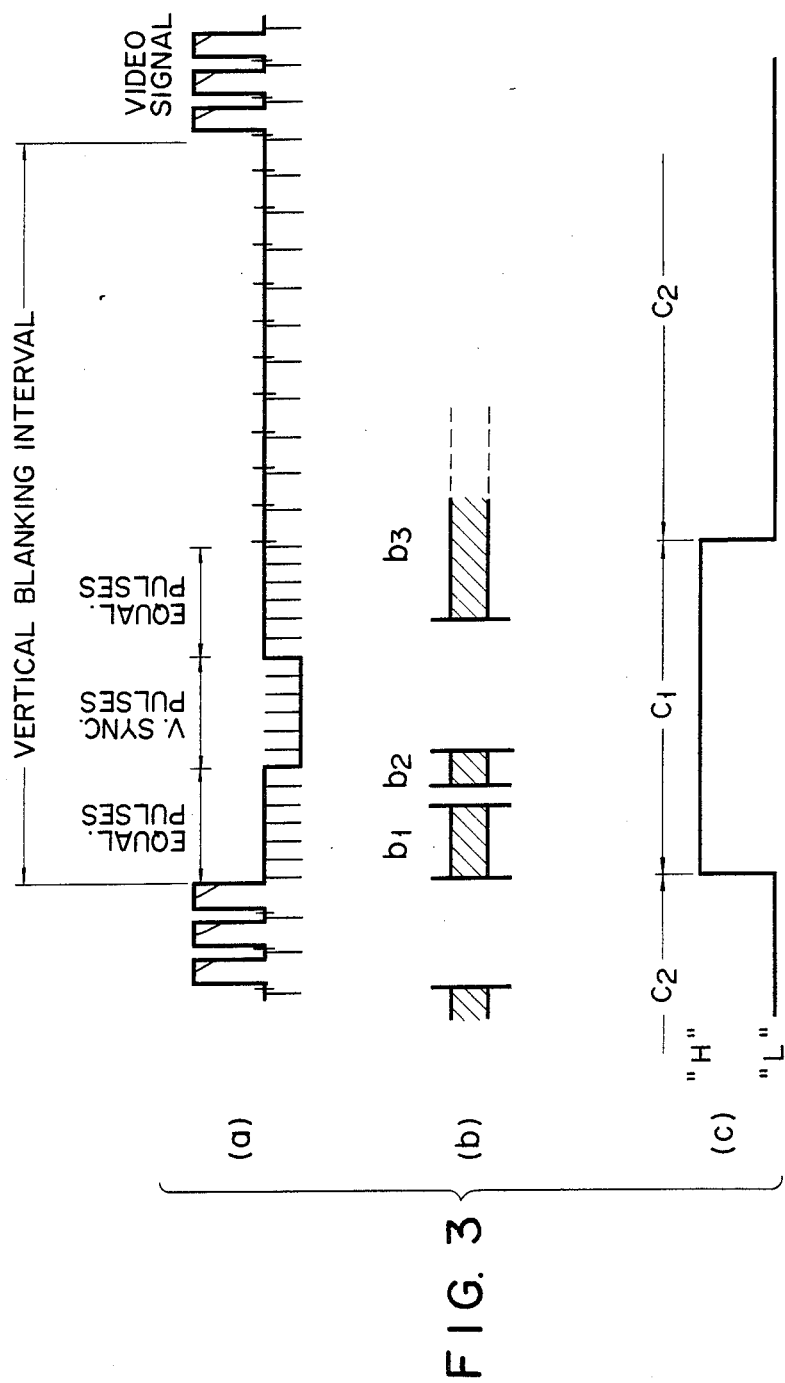
FIGS. 3 and 4 show the waveforms for explaining the operation of this embodiment.

FIG. 3(a) shows the waveform of a vertical blanking interval of an input TV signal, FIG. 3(b), the operation timing of ghost canceling circuit 15 and FIG. 3(c), operation timing of switch 50. In FIG. 3(c), the time period $C_1$ shows a period during which switch 50 is switched to first terminal 51 and the time period $C_2$ shows a period during which switch 50 is switched to second terminal 52.

A transfer of tap gain data from tap gain memory 29 to tap gain holding circuit 23 is effected during the initial portion of the vertical blanking period as indicated by $b_1$ in FIG. 3(b). Vertical synchronizing pulses appear soon after the transfer of the tap gain data has been completed. During the period $b_2$ in FIG. 3(b), the output waveform of ghost canceller 15 is latched in ghost detector 27. The ghost detector 27 includes a waveform memory which once stores the leading edge portion of a vertical synchronizing pulse of the latched output waveform as a reference waveform for ghost detection. Based on the reference waveform which has been stored in the waveform memory, the ghost detector 27 detects the position, polarity, etc. of the ghost during the period $b_3$ in FIG. 3(b) and tap gain correcting circuit 28 corrects the contents of tap gain memory 28 on the basis of the ghost detection. A calculation for ghost detection and tap gain correction is performed on the reference waveform which has once been stored in the waveform memory. Therefore, the calculation may be performed at a low speed, and most time of one field period may be used for the calculation as indicated by $b_3$ in FIG. 3(b).

Corrected tap gains are transferred to tap gain holding circuit 23 at the beginning of the next vertical blanking time period. The switch 50 is switched to second terminal 52 over most time of one field period to selectively provide an output signal of ghost canceling circuit 15 to output terminal 30. The switch 50 is switched to first terminal 51 only over a part of the vertical synchronizing time period including the time interval of the data transfer from tap gain memory 29 to tap gain holding circuit 23 to selectively provide an input TV signal at input terminal 10 to output terminal 30.

Figure 4:
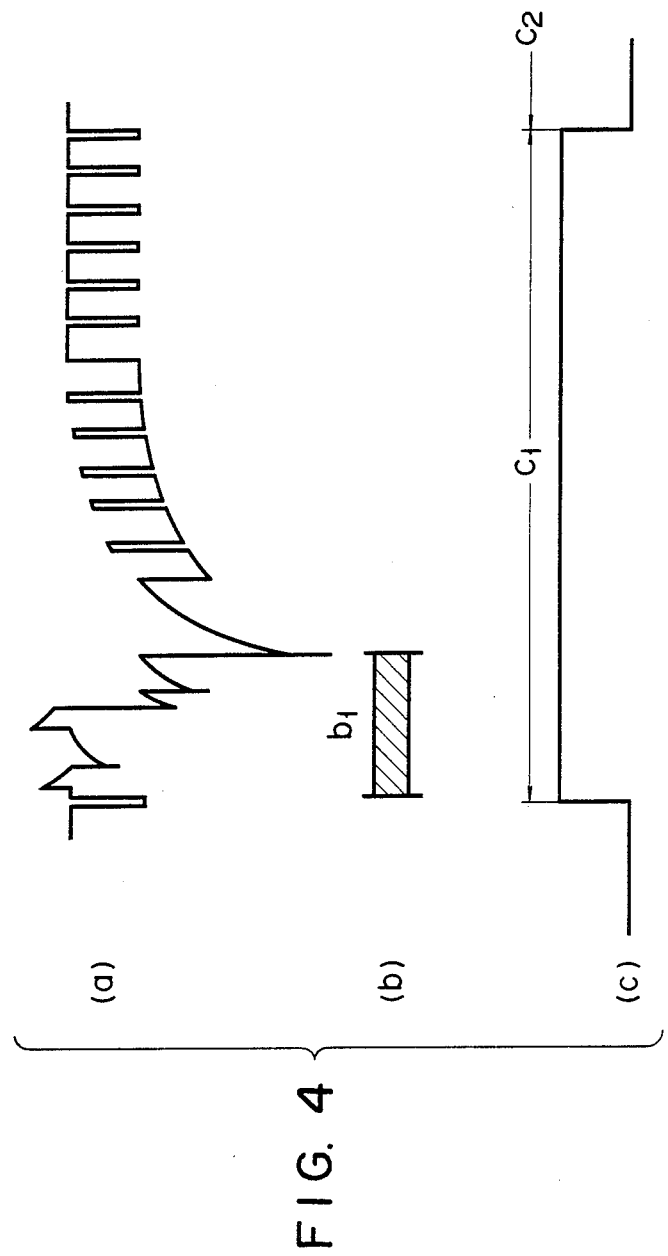

The output waveform of ghost canceling circuit 15 which is produced when the tap gain data is written into tap gain holding circuit 23 is as shown in FIG. 4(a). The period $b_1$ in FIG. 4(b) shows, like the period $b_1$ in FIG. 3(b), the period during which the tap gain data is transferred to tap gain holding circuit 23. FIG. 4(c) shows the operation of switch 50.

An appearance of an appreciably deformed waveform as shown in FIG. 4(a) is mainly due to the fact that a variation exists in the switching operation speed of each bit of D/A converter in tap gain holding circuit 23. When an input digital code shifts, for example, from [01111111] to [10000000], the digital value varies only by an amount corresponding to the least significant bit. In spite of the fact, a transient response of a greater level appears in the output of the D/A converter. Such a transient response is usually called a glitch of the D/A converter. The polarity and level of such a glitch vary depending upon a shift of the input digital code from a code to another code. During a field, glitches of a greater level may occur simultaneously at a number of taps, causing the operation of a vertical synchronizing circuit to be disturbed.

In the embodiment of FIG. 2, the switch 50 is switched to first terminal 51 during the time period in which the tap gain data is written into tap gain data holding circuit 23 and during the subsequent time period in which the transient response of tap gain holding circuit 23 may become small. Since, in this case, a signal on input terminal 10 is directly output to output terminal 30, there appears no disturbance due to the glitch. Since the signal which is included in that time period is comprised mainly of vertical synchronizing pulses and equalizing pulses, an output TV signal is output from output terminal 30 in which the vertical synchronizing pulses and equalizing pulses contain ghost components. The vertical synchronizing system for a TV set is normally less likely to be disturbed by the ghost components and thus the vertical synchronization is hardly disturbed, noting that if the ghost components are great enough to disturb the vertical synchronization it cannot be expected that the ghost canceling circuit per se performs a correct operation.

The signal is output from output terminal 30 through switch 50, but an output of ghost canceling circuit 15 is always supplied to ghost detector 27. At this time, a transient response of tap gain holding circuit 23 remains in the leading edge of the vertical synchronizing pulse, but it is to be noted that an excess transient response occurs once per several fields to several tens of fields. An adverse effect of such excess transient response on the tap gain correction control is to the extent to which it can be disregarded. The subject matter of this invention is not restricted to whether or not an input signal to ghost detector 27 is taken from any particular position.

According to this invention, it is possible to implement a ghost canceller which entirely prevents any adverse effect resulting from a transient response upon the entry of data into tap gain holding circuit 23 from appearing on the TV screen.

Figure 5:
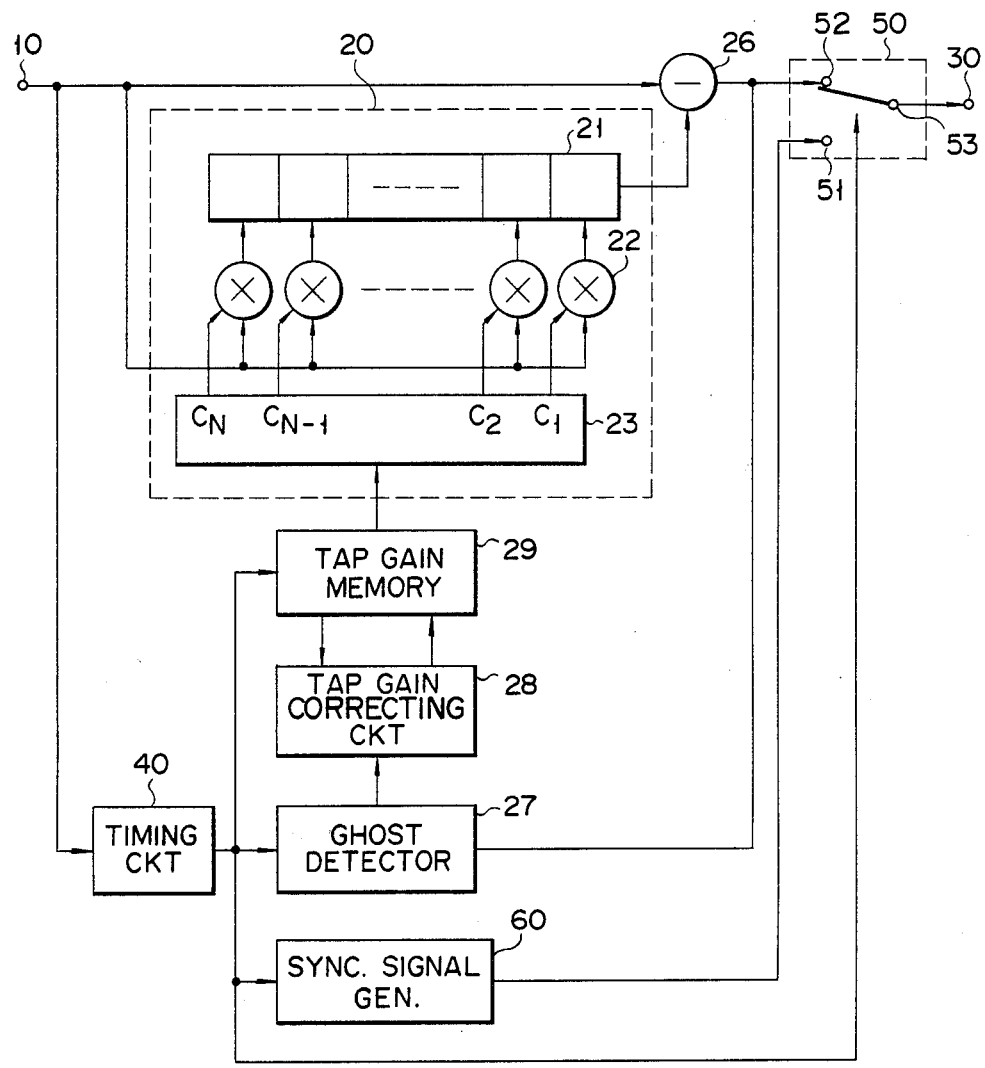
FIG. 5 is a block diagram of another embodiment of this invention.

FIG. 5 shows a ghost canceller according to another embodiment of this invention. The arrangement of FIG. 5 is the same as that of FIG. 2 except for the addition of a synchronizing signal generator 60. The synchronizing signal generator 60 is adapted to produce synchronizing signals, such as vertical synchronizing pulses and equalizing pulses, under the control of timing circuit 40. In this connection it is to be noted that the phase of these pulses is synchronized with that of the corresponding pulses of a received signal. In this embodiment, switch 50 is switched to synchronizing signal generator 60 during a time period in which the data is written into tap gain holding circuit 23. By doing so, a ghost-free signal appears from output terminal 30 during any one field time period and thus it is possible to completely eliminate the disturbance of the vertical synchronization on the TV screen.

Although the point of time at which the data starts to be written into tap gain holding circuit 23 is made coincident with the start of the vertical blanking time period, this is one example. The start point may be made somewhat earlier or later than the start of the vertical blanking time period so long as it is involved at a position where no adverse effect appears on the TV screen and where a reference waveform (for example, the leading edge of the vertical synchronizing pulse) for ghost detection is not appreciably affected. The time at which switch 50 is switched from first terminal 51 to second terminal 52 is determined dependent upon how far an adverse effect is involved by the transient response of the tap gain holding circuit 23. It is not necessarily required that the time be made coincident with the end of the equalizing pulse period.

This invention, if it is related to a ghost canceller of a type using a transversal filter, may be applied thereto irrespective of the arrangement and connection of the transversal filter as well as, for example, a control algorithm for tap gain correction.

Furthermore, this invention may also be applied to a ghost canceller of a type in which use is made of a memory adapted to perform the same function as that of both tap gain holding circuit 23 and tap gain memory 29 and a calculation for tap gain correction is performed within a short interval of the vertical blanking time period.

What is claimed is:

1. A ghost canceller comprising:
   a ghost canceling circuit including a tranversal filter connected to receive a television input signal including a ghost component and having variable tap gains, and a tap gain holding circuit for holding tap gains of said transversal filter;
   a ghost detector for detecting the ghost component in an output signal of said ghost canceling circuit;
   means for successively and periodically writing tap gain data into said tap gain holding circuit in response to said ghost detector to cause said tap gain holding circuit to successively correct the tap gains of said transversal filter so that the ghost component in the output signal of said ghost canceling circuit are canceled out; and
   output means for permitting a signal other than the output signal of said ghost canceling circuit to be selectively taken out during a first time period including an interval in which tap gain data is written into said tap gain holding circuit and for permitting an output signal of said ghost canceling circuit to be selectively taken out during a second time period other than the first time period;
   wherein the first time period is a portion of a vertical blanking period of the television input signal, a synchronizing signal generating means is provided for generating synchronizing signals in the vertical blanking period in response to the television input signal, and the signal selected during the first time period is an output signal of said synchronizing signal generating means.

2. A ghost canceller according to claim 1, in which the signal which is selectively taken out during the first time period is the television input signal of said ghost canceling circuit.

3. A ghost canceller comprising:
   a ghost canceling circuit including a transversal filter connected to receive a television input signal containing vertical blanking periods, video signal periods, and a ghost component and having variable tap gains, and a tap gain holding circuit for holding tap gains of said transversal filter;
   a ghost detector coupled to said ghost canceling circuit for detecting the ghost component contained in an output signal of said ghost canceling circuit;
   means responsive to said ghost detector for successively writing tap gain data into said tap gain holding circuit during vertical blanking periods of the television input signal to cause said tap gain holding circuit to successively correct the tap gains of said transversal filter so that the ghost component in the output signal of said ghost canceling circuit is canceled out; and
   output means for permitting a signal other than the output signal of said ghost canceling circuit to be selectively taken out during a first time period in the vertical blanking period including a time period during which tap gain data is written into said tap gain holding circuit and permitting the output signal of said ghost canceling circuit to be selectively taken out during a second time period following the first time period and including the video signal period.

4. A ghost canceling circuit according to claim 3, in which the signal taken out during the first time period is the television input signal of said ghost canceling circuit.

5. A ghost canceling circuit according to claim 3, further comprising a synchronizing signal generating means responsive to the television input signal for generating synchronizing signals in the televisionsignal, and in which the first time period is a portion of the vertical blanking period of the television input signal, and the signal taken out during the first time period is an output signal of said synchronizing signal generating means.

* * * * *